United States Patent [19]
Knox et al.

[11] 3,794,117
[45] Feb. 26, 1974

[54] TREATMENT OF SANDSTONE FORMATIONS

[75] Inventors: John A. Knox; Reginald M. Lasater, both of Duncan, Okla.

[73] Assignee: Halliburton Company, Duncan, Okla.

[22] Filed: Sept. 5, 1972

[21] Appl. No.: 286,529

[52] U.S. Cl. .................................. 166/307, 252/8.55
[51] Int. Cl. ............................................. E21b 43/27
[58] Field of Search......... 166/307, 282; 252/8.55 C

[56] References Cited
UNITED STATES PATENTS

| | | | |
|---|---|---|---|
| 3,343,602 | 9/1967 | Knox et al. | 166/307 |
| 2,693,855 | 11/1954 | Bond | 166/307 X |
| 3,319,714 | 5/1967 | Knox | 166/307 |
| 2,681,889 | 6/1954 | Menaul et al. | 166/307 |
| 3,233,672 | 2/1966 | Carpenter | 166/307 |
| 3,353,603 | 11/1967 | Knight | 166/307 |
| 3,681,240 | 8/1972 | Fast et al. | 166/307 X |
| 3,254,718 | 6/1966 | Dunlap | 166/307 |
| 3,421,585 | 1/1969 | Garcia | 166/307 |

*Primary Examiner*—Stephen J. Novosad
*Attorney, Agent, or Firm*—Thomas R. Weaver; C. Clark Dougherty, Jr.; John H. Tregoning

[57] ABSTRACT

The present invention provides a method of treating a subterranean sandstone formation with an aqueous acid solution containing hydrofluoric acid wherein the reaction rate of the acid with the formation is retarded and substantial penetration of the formation with active acid results.

13 Claims, No Drawings

TREATMENT OF SANDSTONE FORMATIONS

This invention provides an improved method of acidizing subterranean sandstone formations, and more particularly, a method of acidizing sandstone formations with aqueous acid solutions containing hydrofluoric acid wherein the reaction rate of the hydrofluoric acid with sand and clay in the formation is retarded so that active acid solution penetrates the formation for substantial distances therein.

The treatment of subterranean sandstone formations for the purpose of stimulating the production of oil and gas therefrom wherein an aqueous hydrofluoric acid solution is introduced into the formation is known. When the hydrofluoric acid solution contacts the sandstone formation, siliceous minerals and clay in the formation are dissolved thereby increasing the permeability of the formation. Commonly, aqueous solutions containing mixtures of hydrofluoric and hydrochloric acid are employed in such treatments so that small amounts of calcium carbonate present in the sandstone formation are dissolved by the hydrochloric acid and so that the hydrofluoric acid-clay reaction products formed remain dissolved in the acid solution.

While such aqueous acidizing solutions containing hydrofluoric acid effectively dissolve portions of sandstone formations when introduced therein, a problem commonly encountered is that the acid solution becomes spent within areas of the formation adjacent to the wellbore, and little or no active acid solution penetrates the outlying portions of the formation. That is, the reaction of the hydrofluoric acid on sand and clay is often so rapid that only portions of the formation adjacent to the well-bore are dissolved and the production of oil and/or gas from the formation is not increased, or increased only slightly. Further, the excessive dissolution of a formation in the area of the well-bore can result in damage to the formation such as communication or channeling between producing zones, otherwise separated.

By the present invention an improved method of acidizing sandstone formations is provided wherein the reaction rate of hydrofluoric acid within the formation is retarded, and as a result, substantial penetration of the formation with active acid is achieved.

Broadly described, the method of the present invention comprises contacting an oil containing sandstone formation with a surface active compound having the property of rendering the surfaces of the formation oil-wet thereby imparting hydrophobic properties to the formation. As a result of the formation having hydrophobic properties, the reaction rate of an aqueous hydrofluoric acid solution with the formation is retarded and substantial penetration of the formation with active acid solution can be achieved.

When the sandstone formation to be treated contains oil, the surface active compound can be introduced into the formation in the form of a preflush solution, or alternatively, the surface active compound can be combined with the aqueous hydrofluoric acid solution and introduced simultaneously therewith.

When the sandstone formation to be treated contains little or no oil, an oil preflush can be utilized with a surface active compound contained therein, or both the surface active compound and a quantity of oil can be combined with the aqueous acid solution and introduced into the formation simultaneously therewith.

The term "oil" is used herein to mean liquid hydrocarbons, preferably liquid hydrocarbon mixtures of relatively low gravity such as diesel oil or kerosene.

A variety of surface active compounds can be utilized in accordance with the present invention. Since sandstone formations usually carry a negative surface charge, the sand initially has an electrostatic attraction for cationic surface active compounds. However, in solutions of low pH the surface charge changes to neutral and then to positive by the preferential adsorption of hydrogen ions. Thus, the sand initially adsorbs anionic surface active compounds and then adsorbs cationic surface active compounds. Nonionic surface active compounds are also adsorbed on the sandstone surfaces by the mechanism of hydrogen bonding. By the present invention, any of a variety of anionic, cationic or nonionic surface active compounds can be utliized so long as the compound used renders the sandstone formation oil-wet in the presence of oil thereby imparting hydrophobic properties to the formation surfaces. The resulting oil-wet hydrophobic surfaces are more difficult for the aqueous hydrofluoric acid solution to contact thereby slowing the reaction of the acid.

Particularly suitable surface active compounds for use in accordance with the method of the present invention are those selected from the group consisting of anionic sulfonates, nonionic ethoxylated alcohols and cationic nitrogen containing surface active compounds. Examples of suitable anionic sulfonates are sodium dodecyl benzene sulfonate, sodium tridecyl sulfonate and sodium propyl naphthalene sulfonate. Examples of suitable nonionic ethoxylated alcohols are octyl phenoxy (polyethylene oxide)$_{10}$ ethanol and (polyoxyethylene)$_a$ lauryl alcohol.

While a variety of cationic nitrogen containing surface active compounds may be utilized, preferred such compounds are as follows:

a. amines having the following formula

wherein $R_1$ represents hydrogen or an alkyl radical having from eight to 18 carbon atoms and $R_2$ represents an alkyl radical having from eight to 18 carbon atoms, b. primary alkyl amine acetates having the following formula

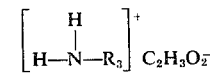

wherein $R_3$ represents an alkyl radical having from eight to 18 carbon atoms, c. an alkyl trimethylene diamine having the following formula

wherein $R_4$ represents an alkyl radical having from eight to 18 carbon atoms, d. a quaternary ammonium compound having the following formula

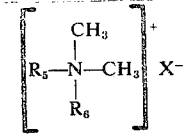

wherein $R_5$ represents an alkyl radical having from one to 20 carbon atoms, $R_6$ represents an alkyl or aryl radical having from one to 20 carbon atoms, and X represents a halide or sulfate radical, and mixtures of the above compounds.

Examples of the foregoing nitrogen containing surface active compounds are lauryl amine, palmityl dimethyl amine, stearyl trimethyl ammonium chloride, stearyl propylene diamine and cetyl dimethyl benzyl ammonium chloride.

In carrying out the method of the present invention for acidizing sandstone formations, an aqueous acid solution containing hydrofluoric acid is prepared in a conventional manner. Preferably, the aqueous acid solution contains both hydrochloric acid and hydrofluoric acid. A particularly suitable such acid solution is comprised of hydrochloric acid present in an amount of about 5 percent by weight to about 30 percent by weight, and hydrofluoric acid present in an amount from about 1 percent by weight to about 15 percent by weight. The solution of hydrochloric and hydrofluoric acid may be prepared by adding a quantity of ammonium bifluoride to a quantity of aqueous hydrochloric acid solution. For example, 4.4 percent ammonium bifluoride, by weight, added to a 15 percent by weight aqueous solution of hydrochloric acid results in a mixture containing 3.1 percent by weight hydrofluoric acid in a 12.5 percent by weight aqueous solution of hydrochloric acid. A double strength solution may be prepared by adding 8.7 percent ammonium bifluoride, by weight, a given quantity of 15 percent by weight solution of hydrochloric acid. The resulting mixture contains 6.2 percent by weight hydrofluoric acid in a 9.0 percent by weight hydrochloric acid solution. As will be understood by those skilled in the art, for particular applications or specific well conditions, the concentrations of hydrochloric and hydrofluoric acids may be increased or decreased as required.

If the sandstone formation to be treated does not contain sufficient oil to wet the surfaces of the sandstone, an oil preflush solution can be introduced into the formation prior to contacting the formation with the aqueous acid solution containing hydrofluoric acid. When such an oil preflush solution is utilized, the surface active compound can be combined therewith. The surface active compound is preferably combined with the oil preflush solution in an amount of from about 0.1 percent to about 10 percent by volume. As will be understood, the oil preflush solution can contain a variety of other materials such as emulsion preventing agents, fluid loss agents, etc. After the oil preflush solution containing the surface active compound has been pumped or otherwise introduced into the formation thereby causing the formation to be oil wet, the aqueous acid solution containing hydrofluoric acid is introduced into the formation.

A preferred technique for carrying out the method of the present invention is to combine the surface active compound directly with the aqueous acid solution. This technique is particularly suitable in circumstances where the sandstone formation to be treated already contains oil. While the particular quantity of surface active compound combined with the acid solution depends on various factors such as the type of formation to be treated and the treatment results desired, the surface active compound is generally combined with the aqueous acid solution in an amount of from about 0.1 to about 10 percent by volume of acid solution. When a 12.5 percent by weight hydrofluoric acid is utilized, the surface active compound used is preferably combined therewith in an amount in the range of from 0.1 to 10 percent by volume of acid solution.

Yet a further technique which can be utilized in carrying out the method of the present invention is to combine both the surface active compound and a quantity of oil with the aqueous acid treating solution. In this technique, the surface active compound is preferably combined with the aqueous acid solution in an amount of from about 0.1 to about 10 percent by volume, and the oil is then combined with the surface active compound-aqueous acid mixture in an amount of from about 0.1 to about 10 percent by volume of acid solution.

As stated previously, in carrying out the method of the present invention using any of the above-described techniques, the contact of the sandstone formation with a surface active compound of the type described above in the presence of oil renders the surfaces of the formation oil-wet and hydrophobic. This hydrophobic property causes the reaction of hydrofluoric acid on the sandstone formation surfaces to be retarded, and consequently active acid solution penetrates to substantial distances outwardly from the well bore before becoming spent. The greater penetration with active acid stimulates the production of oil and gas from the formation.

The following examples are presented to illustrate certain specific embodiments of this invention, but are not intended to be construed so as to be restrictive of the spirit and scope thereof.

Example 1

25 ml. test aqueous acid solutions are prepared in the laboratory containing 3 percent by weight hydrofluoric acid and 12 percent by weight hydrochloric acid. A quaternary ammonium chloride surface active compound, namely stearyl trimethyl ammonium chloride (50 percent solution in isopropyl alcohol) is combined with the test acid solutions in the amount of 2.0 percent by volume of acid solution. 4 gram samples of silica flour and montmorillonite clay are prepared (95 percent silica flour and 5 percent clay) to simulate sandstone formations, placed in polyethylene reaction vessels and preflushed with 2.5 ml. of kerosene. The acid solutions containing the surface active compounds as well as acid solutions without surface active compounds are reacted with the silica flour-clay samples at 75°F ($\pm$ 2°F) with constant shaking, and the reaction rates are compared by comparison of reaction rate constants calculated in accordance with the following general equation:

$$k = (2.303/t) \log (C_o/C_t)$$

wherein: $k$ = reaction rate constant
$t$ = time of reaction
$C_o$ = concentration of hydrofluoric acid at $t = o$
$C_t$ = concentration of hydrofluoric acid at specific time Reaction rate constants are determined for both the acid solutions containing surface active compounds and acid solutions without surface active compounds and a retardation factor is determined in accordance with the following formula:

$$RF = (k_1/k_2)$$

wherein:
$k_1$ = rate constant for acid solution containing no surface active compounds, and
$k_2$ = rate constant for acid solution containing surface active compounds The results of these tests are shown in Table I below.

TABLE I.—COMPARISON OF REACTION RATES OF AQUEOUS HCl-HF ACID SOLUTIONS CONTAINING SURFACE ACTIVE AGENTS ON SIMULATED SANDSTONE FORMATIONS

| | Acid solutions not containing surface active compounds | | Acid solutions containing surface active compounds | | |
|---|---|---|---|---|---|
| Reaction time, minutes | Concentration of hydrofluoric acid at reaction time, mol/liter[1] | Rate constant ($k_1$) | Concentration of hydrofluoric acid at reaction time, mol/liter[1] | Rate constant ($k_1$) | Retardation factor (RF) |
| 0 | 1.685 | | 1.685 | | |
| 6 | 1.129 | 0.06670 | 1.178 | 0.05960 | 1.12 |
| 12 | 0.918 | .05064 | 1.078 | .03721 | 1.36 |
| 18 | .826 | .03960 | 1.013 | .02825 | 1.40 |
| 30 | .750 | .02700 | 0.925 | .02001 | 1.35 |
| 45 | .684 | .02004 | .834 | .01564 | 1.28 |
| 60 | .655 | .01576 | .792 | .01259 | 1.25 |

[1] Concentrations determined using the "Orion Fluoride Ion Activity Electrode."

Example 2

The procedure of Example 1 is repeated except that in each test the silica-clay mixture is preflushed with 25 ml. of kerosene, the excess kerosene being decanted from the reaction vessel prior to the addition of acid solution. In two tests, the kerosene preflush contains 1.0 percent by volume of an oil soluble cationic nitrogen containing surface active agent, namely oleyl propylene diamine. After the preflush, the samples are reacted with 25 ml. of 3% HF-12% HCl aqueous acid solution. In two additional tests the kerosene preflush contains the surface active compound mentioned above, and in addition, the aqueous acid solution contains 2.0 percent by volume of an acid soluble cationic nitrogen containing surface active agent, i.e., lauryl trimethyl ammonium chloride (50 percent solution in isopropyl alcohol). In two final tests, the kerosene preflush does not contain surface active agent, but the aqueous acid solutions contain the surface active agent described above. The results of these tests are given in Table II below:

The operability of the method of the present invention to retard the reaction of aqueous acid solutions containing hydrofluoric acid with sand and clay wherein the surface active agent is added either to an oil preflush or to the acid solution is illustrated by the foregoing.

Example 3

A variety of cationic amine type surface active compounds are tested in accordance with the procedure described in Example 2 above. The properties of the surface active compounds tested are given in Table III below and the calculated retardation factors relating to the surface active compounds are given in Table IV:

TABLE III

PROPERTIES OF SURFACE ACTIVE COMPOUNDS

| Surface Active Compound General Chemical Name | Carbon Chain Length | Moles of Ethylene Oxide | Molecular Weight |
|---|---|---|---|
| Octylamine | 8 | 0 | 128 |
| Dodecylamine | 12 | 0 | 185 |
| Oleylamine | 18 | 0 | 267 |
| Octadecylamine | 18 | 0 | 269 |
| Dimethyl-dodecylamine | 12 | 0 | 219 |
| Dimethyl-octadecylamine | 18 | 0 | 304 |
| Dimethyl-soyamine | 18 | 0 | 299 |
| Bis(2-hydroxyethyl)-cocoamine | 12 to 14 | 2 | 285 |
| Polyoxyethylene (15) cocoamine | 12 to 14 | 15 | 860 |
| Bis(2-hydroxyethyl)-soyamine | 16 to 18 | 2 | 350 |
| Polyoxyethylene (15) soyamine | 16 to 18 | 15 | 390 |

TABLE II.—COMPARISON OF REACTION RATES OF AQUEOUS HCl-HF ACID SOLUTIONS USING OIL-SOLUBLE AND ACID-SOLUBLE SURFACE ACTIVE AGENTS

| | No surface active agents used in either oil preflush or acid solution | | Surface active agent contained in oil preflush only | | | Surface active agent contained in acid solution | | | Surface active agent contained in both oil preflush and acid solution | | |
|---|---|---|---|---|---|---|---|---|---|---|---|
| Reaction time, minutes | mol/liter of hydrofluoric acid at reaction time[1] | Rate constant ($k_1$) | mol/liter of hydrofluoric acid at reaction time[1] | Rate constant ($k_1$) | Retardation factor (RF) | mol/liter of hydrofluoric acid at reaction time[1] | Rate constant ($k_1$) | Retardation factor (RF) | mol/liter of hydrofluoric acid at reaction time[1] | Rate constant ($k_1$) | Retardation factor (RF) |
| 0 | 3.00 | | 3.00 | | | 3.00 | | | 3.00 | | |
| 6 | 1.86 | 0.07968 | 2.48 | 0.03178 | 2.51 | 2.34 | 0.04141 | 1.924 | 2.44 | 0.03443 | 2.31 |
| 12 | 1.58 | .05346 | 2.06 | .03132 | 1.71 | 1.93 | .03673 | 1.455 | 1.99 | .03420 | 1.56 |
| 18 | 1.46 | .04002 | 1.83 | .02745 | 1.46 | 1.69 | .03187 | 1.256 | 1.76 | .02962 | 1.35 |
| 30 | 1.37 | .02614 | 1.57 | .02160 | 1.21 | 1.46 | .02403 | 1.088 | 1.51 | .02291 | 1.14 |
| 45 | 1.33 | .01809 | 1.44 | .01632 | 1.11 | 1.34 | .01792 | 1.009 | 1.40 | .0170 | 1.07 |
| 60 | 1.29 | .01408 | 1.23 | .01487 | 0.95 | 1.28 | .01420 | 0.992 | 1.30 | .01395 | 1.01 |

[1] Concentrations determined using the "Orion Fluoride Ion Activity Electrode."

| | | | |
|---|---|---|---|
| soyamine Bis(2-hydroxyethyl)-tallowamine | 16 to 18 | 2 | 350 |
| Polyoxyethylene (15) tallowamine | 16 to 18 | 15 | 925 |
| Bis(2-hydroxyethyl)-octadecylamine | 18 | 2 | 362 |
| Polyoxyethylene (50)-octadecylamine | 18 | 50 | 2470 |
| N,N' Polyoxyethylene (3)-N-tallow-1,3 diaminopropane | 16 to 18 | 3 | 532 |
| N,N' Polyoxyethylene (10)-N-tallow-1,3 diaminopropane | 16 to 18 | 10 | 860 |
| Octylamine Acetate | 8 | 0 | 200 |
| Dodecylamine Acetate | 12 | 0 | 250 |
| Soyamine Acetate | 16 to 18 | 0 | 341 |
| Tallowamine Acetate | 16 to 18 | 0 | 340 |
| Octadecylamine Acetate | 18 | 0 | 344 |

TABLE IV.—COMPARISON OF RETARDATION FACTORS FOR VARIOUS SURFACE ACTIVE COMPOUNDS

| Surface active compound | Retardation factor at time (min.) shown | | | | | |
|---|---|---|---|---|---|---|
| | 6 | 12 | 18 | 30 | 45 | 60 |
| Octylamine | 1.129 | 1.199 | 1.219 | 1.092 | 1.062 | 1.073 |
| Dedecylamine | 2.882 | 2.913 | 2.920 | 1.829 | 1.327 | 1.165 |
| Oleylamine | 1.505 | 1.410 | 1.341 | 1.160 | 1.106 | 1.086 |
| Octadecylamine | 1.517 | 1.348 | 1.160 | 1.025 | 0.982 | 1.020 |
| Dimethyl-dodecylamine | 1.882 | 1.642 | 1.554 | 1.382 | 1.278 | 1.240 |
| Dimethyl-octadecylamine | 1.382 | 1.633 | 1.803 | 1.542 | 1.572 | 1.513 |
| Dimethyl-soyamine | 1.978 | 2.418 | 2.072 | 2.183 | 1.873 | 1.747 |
| Bis(2-hydroxyethyl)-cocoamine | 1.220 | 1.139 | 1.149 | 1.171 | 1.096 | 1.090 |
| Polyoxyethylene (15) cocoamine | 1.220 | 1.146 | 1.194 | 1.177 | 1.106 | 1.095 |
| Bis(2-hydroxyethyl)-soyamine | 1.441 | 1.554 | 1.477 | 1.397 | 1.298 | 1.270 |
| Polyoxyethylene (15) soyamine | 1.233 | 1.146 | 1.127 | 1.117 | 1.106 | 1.152 |
| Bis(2-hydroxyethyl)-tallowamine | 1.441 | 1.518 | 1.438 | 1.382 | 1.310 | 1.179 |
| Polyoxyethylene (15) tallowamine | 1.109 | 1.146 | 1.207 | 1.112 | 1.096 | 1.152 |
| Bis(2-hydroxyethyl)-octadecylamine | 1.140 | 1.227 | 1.242 | 1.313 | 1.298 | 1.257 |
| Polyoxyethylene (50)-octadecylamine | 1.000 | 1.021 | 1.039 | 1.073 | 1.087 | 1.107 |
| N,N' Polyoxyethylene (3)-N-tallow-1,3 diaminopropane | 0.923 | 1.048 | 1.093 | 1.042 | 1.035 | 1.043 |
| N,N' Polyoxyethylene (10)-N-tallow-1,3 diaminopropane | .875 | 1.058 | 1.028 | 1.063 | 1.040 | 1.050 |
| Octylamine acetate | 1.801 | 1.493 | 1.336 | 1.141 | 1.104 | 1.065 |
| Dodecylamine acetate | 2.519 | 2.126 | 1.728 | 1.268 | 1.157 | 1.091 |
| Soyamine acetate | 1.490 | 1.381 | 1.299 | 1.147 | 1.141 | 1.226 |
| Tallowamine acetate | 1.655 | 1.514 | 1.374 | 1.262 | 1.132 | 1.095 |
| Octadecylamine acetate | 1.182 | 1.431 | 1.462 | 1.453 | 1.448 | 1.372 |

While preferred embodiments of the present invention have been described for the purposes of disclosure, it is to be understood that the description and foregoing examples are given to illustrate and explain the invention, and suitable variations may be made within the scope of the appended claims without departing from the invention.

What is claimed is:

1. A method of retarding the reaction rate of an aqueous hydrofluoric acid solution in an oil containing sandstone formation comprising the steps of:

contacting the oil containing sandstone formation with a cationic nitrogen containing compound having the property of rendering the surfaces of the sandstone formation oil-wet thereby imparting hydrophobic properties to said surfaces and retarding the reaction rate of said aqueous hydrofluoric solution thereon; and then contacting said formation with said aqueous hydrofluoric acid solution wherein said cationic nitrogen containing compound is selected from the group consisting of:

an amine having the following formula $$\begin{array}{c} R_1 \\ | \\ N-R_1 \\ | \\ R_2 \end{array}$$

wherein $R_1$ represents hydrogen or an alkyl radical having from eight to 18 carbon atoms and $R_2$ represents an alkyl radical having from eight to 18 carbon atoms, a primary alkylamine acetate having the following formula $$\left[\begin{array}{c} H \\ | \\ H-N-R_3 \end{array}\right]^+ C_2H_3O_2^-$$

wherein $R_3$ represents an alkyl radical having from eight to 18 carbon atoms, an alkyl trimethylene diamine having the following formula $$NH_3(CH_2)_3NHR_4$$

wherein $R_4$ represents an alkyl radical having from eight to 18 carbon atoms, a quaternary ammonium compound having the following formula $$\left[\begin{array}{c} CH_3 \\ | \\ R_5-N-CH_3 \\ | \\ R_6 \end{array}\right]^+ X^-$$

wherein $R_5$ represents an alkyl radical having from one to 20 carbon atoms, $R_6$ represents an alkyl or aryl radical having from one to 20 carbon atoms, and X represents a halide or sulfate radical, and mixtures of said compounds.

2. The method of claim 1 wherein the step of contacting the oil containing sand formation with the surface active compound comprises preflushing said formation with a preflush solution containing the surface active compound.

3. The method of claim 2 wherein the preflush solution is comprised of oil, and the surface active compound is present therein in an amount of from about 0.1 to about 10 percent by volume of oil.

4. A method of retarding the reaction rate of an acid solution containing hydrofluoric acid in an oil containing sandstone formation comprising the steps of:

mixing a cationic nitrogen containing compound with the aqueous acid solution, said cationic nitrogen containing compound having the property of rendering the surfaces of the sandstone formation oil-wet thereby imparting hydrophobic properties to said surfaces and retarding the reaction rate of said aqueous acid solution thereon; and introducing the aqueous acid solution cationic nitrogen containing compound mixture into said sandstone formation wherein said cationic nitrogen containing compound is selected from the group consisting of:

an amine having the following formula

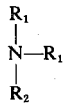

wherein $R_1$ represents hydrogen or an alkyl radical having from eight to 18 carbon atoms, and $R_2$ represents an alkyl radical having from eight to 18 carbon atoms, a primary alkylamine acetate having the following formula

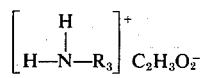

wherein $R_3$ represents an alkyl radical having from eight to 18 carbon atoms, an alkyl trimethylene diamine having the following formula $$NH_3(CH_2)_3NHR_4$$

wherein $R_4$ represents an alkyl radical having from eight to 18 carbon atoms, a quaternary ammonium compound having the following formula

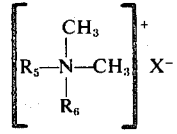

wherein $R_5$ represents an alkyl radical having from one to 20 carbon atoms, $R_6$ represents an alkyl or an aryl radical having from one to 20 carbon atoms, and X represents a halide or sulfate radical, and mixtures of said compounds.

5. The method of claim 4 wherein the surface active compound is mixed with the aqueous acid solution in an amount of from about 0.1 to about 10 percent by volume of acid solution.

6. The method of claim 5 wherein the aqueous acid solution containing hydrofluoric acid contains a mixture of hydrochloric acid and hydrofluoric acid.

7. A method of acidizing a subterranean sandstone formation which comprises:

combining a cationic nitrogen containing compound with an aqueous hydrofluoric acid solution, the cationic nitrogen containing compound having the property of rendering the surface of the sandstone formation oil-wet thereby imparting hydrophobic properties to the formation and retarding the reaction rate of said aqueous hydrofluoric acid solution therein; and introducing the aqueous hydrofluoric acid solution containing the cationic nitrogen containing compound into the formation so that active acid solution penetrates the formation and reacts therewith to increase the permeability thereof wherein said cationic nitrogen containing compound is selected from the group consisting of:

an amine having the following formula

wherein $R_1$ represents hydrogen or an alkyl radical having from eight to 18 carbon atoms and $R_2$ represents an alkyl radical having from eight to 18 carbon atoms, a primary alkylamine acetate having the following formula

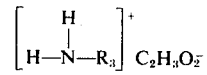

wherein $R_3$ represents an alkyl radical having from eight to 18 carbon atoms, an alkyl trimethylene diamine having the following formula $$NH_3(CH_2)_3NHR_4$$

wherein $R_4$ represents an alkyl radical having from eight to 18 carbon atoms, a quaternary ammonium compound having the following formula

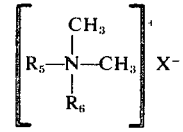

wherein $R_5$ represents an alkyl radical having from one to 20 carbon atoms and $R_6$ represents an alkyl or aryl radical having from one to 20 carbon atoms and X represents a halide or sulfate radical, and mixtures of said compounds.

8. The method of claim 7 which is further characterized to include the step of introducing oil into the formation.

9. The method of claim 8 wherein the step of introducing oil into the formation comprises preflushing the formation with oil.

10. The method of claim 8 wherein the step of introducing oil into said formation comprises combining a quantity of oil with said aqueous hydrofluoric acid solution prior to introducing said acid solution into said formation.

11. The method of claim 10 wherein said oil is combined with said acid solution in an amount of from about 0.1% to about 10% by volume of acid solution.

12. The method of claim 7 wherein the surface active compound is present in the aqueous hydrofluoric acid solution in an amount of from about 0.1 to about 10 percent by volume of acid solution.

13. The method of claim 7 wherein the aqueous hydrofluoric acid solution includes hydrochloric acid mixed therewith.

* * * * *

UNITED STATES PATENT OFFICE
CERTIFICATE OF CORRECTION

Patent No. __3,794,117__   Dated __February 26, 1974__

Inventor(s) __John A. Knox and Reginald M. Lasater__

It is certified that error appears in the above-identified patent and that said Letters Patent are hereby corrected as shown below:

In Column 2, lines 50-52; Column 8, lines 5-7; Column 9, lines 25-27; and Column 10, lines 20-22, that portion of the formula which reads

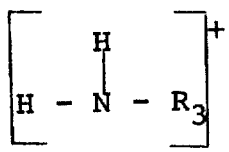

should read

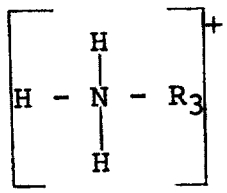

Signed and sealed this 10th day of September 1974.

(SEAL)
Attest:

McCOY M. GIBSON, JR.
Attesting Officer

C. MARSHALL DANN
Commissioner of Patents